United States Patent
Vandendoren et al.

(10) Patent No.: US 7,771,690 B2
(45) Date of Patent: Aug. 10, 2010

(54) PLENUM CRUSHER DUST INJECTION

(75) Inventors: Alain Vandendoren, Green River, WY (US); William E. Stuble, Green River, WY (US)

(73) Assignee: Solvay Chemicals, Inc., Houston, TX (US)

( * ) Notice: Subject to any disclaimer, the term of this patent is extended or adjusted under 35 U.S.C. 154(b) by 920 days.

(21) Appl. No.: 11/591,162

(22) Filed: Nov. 1, 2006

(65) Prior Publication Data
US 2008/0102008 A1    May 1, 2008

(51) Int. Cl.
C01D 7/12    (2006.01)
B01J 6/00    (2006.01)

(52) U.S. Cl. ...................................... 423/427

(58) Field of Classification Search ......... 423/421–429, 423/232–233, 179, 186, 206.2
See application file for complete search history.

(56) References Cited

U.S. PATENT DOCUMENTS

| | | | |
|---|---|---|---|
| 2,477,262 A | | 7/1949 | Mooser et al. |
| 2,911,061 A | * | 11/1959 | Petersen ........................ 96/19 |
| 2,962,348 A | * | 11/1960 | Seglin et al. ............. 423/206.1 |
| 3,206,526 A | | 9/1965 | Rygaard et al. |
| 3,336,104 A | * | 8/1967 | Miller ........................ 423/305 |
| 3,819,805 A | | 6/1974 | Graves et al. |
| 3,869,538 A | * | 3/1975 | Sproul et al. ............. 423/206.1 |
| 4,341,744 A | * | 7/1982 | Brison et al. ............. 423/206.2 |
| 5,007,823 A | | 4/1991 | Mayotte et al. |
| 5,951,279 A | * | 9/1999 | Hunold et al. ............. 432/106 |
| 6,241,514 B1 | | 6/2001 | Joshi et al. |
| 6,444,026 B1 | * | 9/2002 | Steffler et al. ............... 106/739 |

FOREIGN PATENT DOCUMENTS

| | | | |
|---|---|---|---|
| DE | 10327028 | * | 1/2005 |
| EP | 1440953 | * | 7/2004 |

OTHER PUBLICATIONS

Search report for PCT/EP2007/061544.*

* cited by examiner

*Primary Examiner*—Stanley S. Silverman
*Assistant Examiner*—Daniel C. McCracken
(74) *Attorney, Agent, or Firm*—Brinks Hofer Gilson & Lione

(57) ABSTRACT

Methods for heating a solid material comprising a granular material are provided. Dust is removed from the granular material before it is heated. The dust is injected into the exhaust gas from the heater. The heated dust is recovered and combined with the heated granular material.

38 Claims, 2 Drawing Sheets

PLENUM CRUSHER DUST INJECTION

FIELD OF THE INVENTION

A process for heating dust material is provided.

BACKGROUND

Trona ore is a naturally occurring mineral that consists primarily of sodium sesquicarbonate ($Na_2CO_3$—$NaHCO_3$-$2H_2O$) and about 4 to 12 percent insoluble materials consisting mainly of shale. In the vicinity of Green River, Wyo., trona ore deposits are found at depths ranging form about 800 to 1800 feet underground. The main trona bed varies from 8 to 18 feet in thickness and other beds of less thickness separated by layers of shale are usually found above the main trona bed. Although some solution mining techniques are now being used, trona ore is frequently mechanically mined and carried to the surface for further processing.

Various processes for the production of sodium carbonate from sodium sesquicarbonate are known. In the "monohydrate process," trona ore is crushed, calcined to convert sodium bicarbonate values to sodium carbonate, and dissolved; the solution is filtered, treated with activated carbon to remove soluble organic compounds, and evaporated to crystallize sodium carbonate monohydrate. The monohydrate is dried to produce anhydrous sodium carbonate. See, for example, U.S. Pat. No. 2,962,348, which describes a typical monohydrate process.

When crude trona is crushed, a broad distribution of particle sizes is obtained. Typical sizing, expressed throughout in terms of U.S. Standard Sieves, illustrate this. As discussed in U.S. Pat. No. 3,869,538, ore crushed to 100%−⅜ inch mesh is typically 0%+⅜ inch, 25%+4 mesh, 80%+100 mesh, and 90%+270 mesh. At 100%−¼ inch mesh, a typical distribution of 0%+¼ inch, 10%+4 mesh, 50%+16 mesh, 75%+100 mesh, and 90%+325 mesh. Ore crushed to pass 8 mesh 100% will typically be 0%+8 mesh, 20%+20 mesh, 35%+40 mesh, 50%+100 mesh, 65%+200 mesh, and 80%+400 mesh. Using the entire product from a crushing circuit provides more efficient use of the raw material than if the product is separated into fractions of narrower range.

The smallest particles of trona formed when crude trona is crushed are referred to as trona dust. Handling of trona dust is problematic for a number of reasons including environmental, health and maintenance hazards due to the low density of these small particles. For example, containment of trona dust is difficult when it is transferred from the crusher and loaded onto the calciner feed belt. Dust is kicked up during this process, resulting in inefficient transfer of the trona dust to the calciner and unnecessary exposure to the trona dust. Trona dust frequently has to be cleaned from the equipment and processing unit.

In addition, processing of trona dust in conjunction with granular trona decreases the efficiency of the calciner as compared to processing granular trona alone. Processing trona dust in a rotary kiln-type calciner increases slag, causes refractory brick damage, increases formation of soluble silica and organics, and reduces the feed end temperature of the calciner thereby reducing heat transfer to larger ore size particles. Because there is a temperature gradient in a rotary kiln-type calciner, over calcination occurs in the hot end of the calciner, especially near the surface of particles, which become overexposed to the hot gases. Fine particles collected from the calciner therefore contain a higher level of soluble organic compounds than the coarse particles in the product.

U.S. Pat. No. 3,869,538 describes a method of calcining crushed trona of broad size range to crude sodium carbonate in a fluid bed calciner at 125-225° C. A more uniform temperature in the fluid bed calciner results in fine particles not becoming over calcined, and no concomitant increase in formation of soluble organic material is obtained. Soluble organic materials are but one problem of processing trona dust.

In addition to the trona processing industry, dust processing and recycling is important the cement, alumina, clay and lime industries, for example. U.S. Pat. Nos. 5,007,823 and 6,241,514 describes methods and apparatus, respectively for dust recycling, particularly with application to cement dust. In both of these patents, the dust is recycled back to the kiln in combination with an enriched oxygen atmosphere to facilitate processing of the dust. What is needed are improved methods which address all of the previously discussed issues for handling, processing, and recycling dust, in particular, trona dust to form sodium carbonate.

BRIEF SUMMARY

In one embodiment, a process for heating a solid material comprising a granular material using a kiln is provided. The improvement comprises injecting a dust material into an exhaust gas stream which exits an outlet of the kiln and enters a first particulate capture device; and recovering a recovered dust material from the first particulate capture device. The exhaust gas stream is of a temperature sufficient to affect a desired change in the dust material. The process improvement may further comprise introducing the recovered dust material with a heated granular material for further processing. In other aspects the process improvement may further comprise crushing the solid material to form the dust material and the granular material; separating the dust material from the granular material; injecting the granular material into the kiln; and heating the granular material. In other aspects, the process improvement may further include crushing the solid material in a crusher device to form the dust material; collecting the dust material from the crusher device in a second particulate capture device; and pneumatically transferring the dust material from the second particulate capture device to the exhaust gas stream. The desired change may be drying or calcination. The dust material may be lime, cement, gypsum, coal, a mineral, trona or derived from an ore.

In another embodiment, a process for preparing soda ash from crude trona by calcining crude trona is provided. The improvement comprises injecting trona dust into an exhaust gas stream from an outlet of a calciner; calcining the trona dust in the exhaust gas stream to form calcined trona dust; and recovering the calcined trona dust. In some aspects, the process improvement may further comprise injecting the trona dust prior to or at a first particulate capture device; and collecting the calcined trona dust captured in the first particulate capture device. In other aspects, the process improvements may further comprise crushing the solid material in a crusher device to form the dust material; collecting the dust material from the crusher device in a second particulate capture device; and pneumatically transferring the dust material from the second particulate capture device to the exhaust gas stream. In some aspects, the injecting comprises pneumatically transferring the trona dust with a first gas.

In another embodiment, a process for preparing soda ash from crude trona by calcining crude trona is provided. The improvement comprises injecting trona dust into an exhaust gas stream from an outlet of a calciner; calcining the trona dust in the exhaust gas stream to form calcined trona dust; and recovering the calcined trona dust. In some aspects, the improvement further comprises injecting the trona dust prior to or at a first particulate capture device; and collecting the calcined trona dust captured in the first particulate capture device. In other aspects, the improvement further comprises crushing a trona ore to form trona dust and crushed trona; separating the trona dust from the crushed trona; injecting the crushed trona into the calciner; calcining the crushed trona to form calcined crushed trona; and combining the calcined crushed trona and the calcined trona dust to form combined calcined trona. In other aspects, the improvement further comprises collecting the trona dust in a second particulate capture device; and pneumatically transferring the trona dust from the second particulate capture device to the exhaust gas stream.

In another embodiment, a process for preparing soda ash from crude trona by calcining crude trona is provided. The process comprises removing a trona dust from a crushed crude trona feed being fed to a calciner; injecting the removed trona dust into an exhaust gas stream from the calciner to form calcined trona dust; and recovering the calcined trona dust. In some aspects, the process further comprises capturing the trona dust from the crushed crude trona feed in a particulate capture device; and pneumatically transferring the trona dust from the particulate capture device to the exhaust gas stream. In other aspects, the process further comprises dissolving the recovered calcined trona dust in a solvent; and crystallizing the dissolved trona dust to form sodium carbonate. In yet other aspects, the process further comprises separating the crystallized trona dust from a filtrate; and drying the crystallized trona dust.

In another embodiment, a process for heating a solid material comprising granular material using a kiln is provided. The process comprises removing a dust material from a solid material comprising a granular material and a dust material, said dust material having a particle size smaller than a particle size of the granular material; introducing the granular material into a kiln; heating the granular material in the kiln; injecting the removed dust material into an exhaust gas stream from the kiln; and recovering the injected dust material. In some aspects the process further comprises capturing the dust material from the solid material in a particulate capture device; and pneumatically transferring the dust material from the particulate capture device to the exhaust gas stream.

In another embodiment, a process for heating a solid material comprising a granular material using a kiln is provided. The process improvement comprises separating the solid material into a fine particle size part and a coarse particle size part; injecting the coarse particle size part at a first location of the kiln, wherein the first location is at the hot end of the kiln; and injecting the fine particle size part at a second location of the kiln, wherein the second location is downstream of the first location.

DETAILED DESCRIPTION OF THE PREFERRED EMBODIMENTS

Dust is created in a number of industries where a crude material is crushed into smaller particles for further processing. For economical and environmental reasons, it is advantageous to process this dust. Processing may include heating the dust to affect a desired change such as drying or calcination.

In the trona industry, trona ore is calcined to afford soda ash according to the following chemical equation:

$$2Na_2CO_3 \cdot NaHCO_3 \cdot 2H_2O \rightarrow 3Na_2CO_3 + CO_2 + 5H_2O.$$

As used herein, calcination refers to the process of heating a material to a temperature to afford a change in the chemical or physical constitution.

Figure 1:
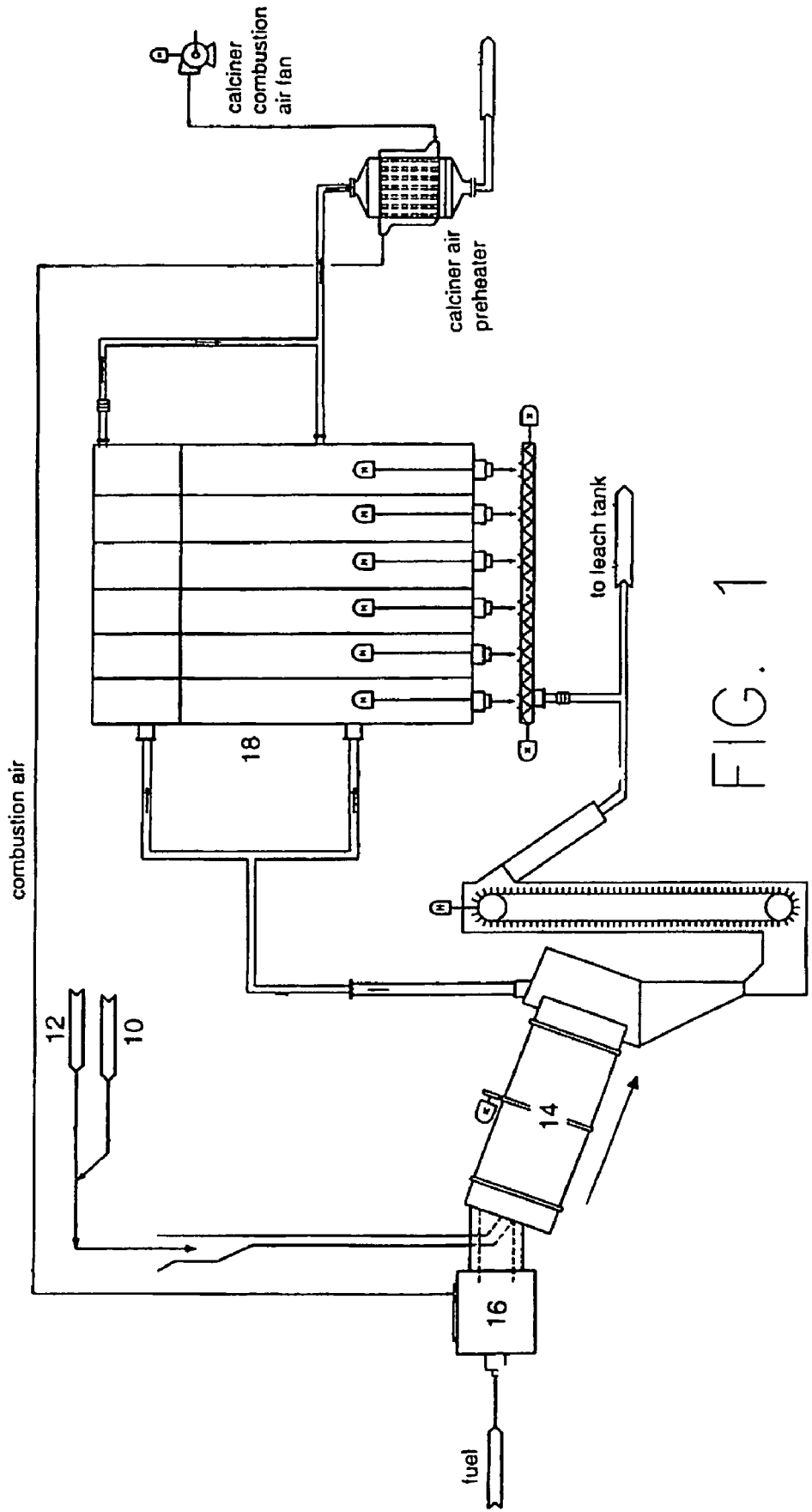
FIG. 1 is a schematic representation of a process for calcining dust material in combination with granular material.

FIG. 1 illustrates one method for calcining dust material in which dust material 10 is combined with granular material 12. The dust material and granular material are combined prior to entering the calciner on a calciner feed belt, for example. The combined feed is fed to a rotary calciner 14 which is fueled with a natural gas or coal fed calciner burner 16. Both the loading of the crusher dust onto the feed belt and feeding dust to the calciner kicks up dust material. This method not only results in inefficient processing of the dust material, but also poses environmental, health and safety concerns.

The dust material and granular material are calcined in the rotary calciner. The larger particles are then dropped on to a conveyor belt and delivered to processing equipment. Dust particles which are carried off by the calciner exhaust gas are collected in an electrostatic precipitator 18. The calcined dust particles and calcined granular particles are combined for further processing.

In an improved process for heating dust material and granular material, the dust material and granular materials are introduced separately into the process. In particular, the dust material may be introduced at any point downstream of the point of introduction of the granular material and prior to or at the plenum of the particulate capture device. As used herein, downstream refers to a location along the processing route that is after an upstream location. The direction of the processing route is the direction which the material to be processed travels. Both the granular material and dust material may be introduced into a heater such as a calciner or kiln. However, the dust material may be introduced downstream of where the granular material is introduced. For example, the granular material may be introduced at the front end or hot end of the calciner. The dust material is introduced into the calciner at a location downstream of the front end of the calciner.

Figure 2:
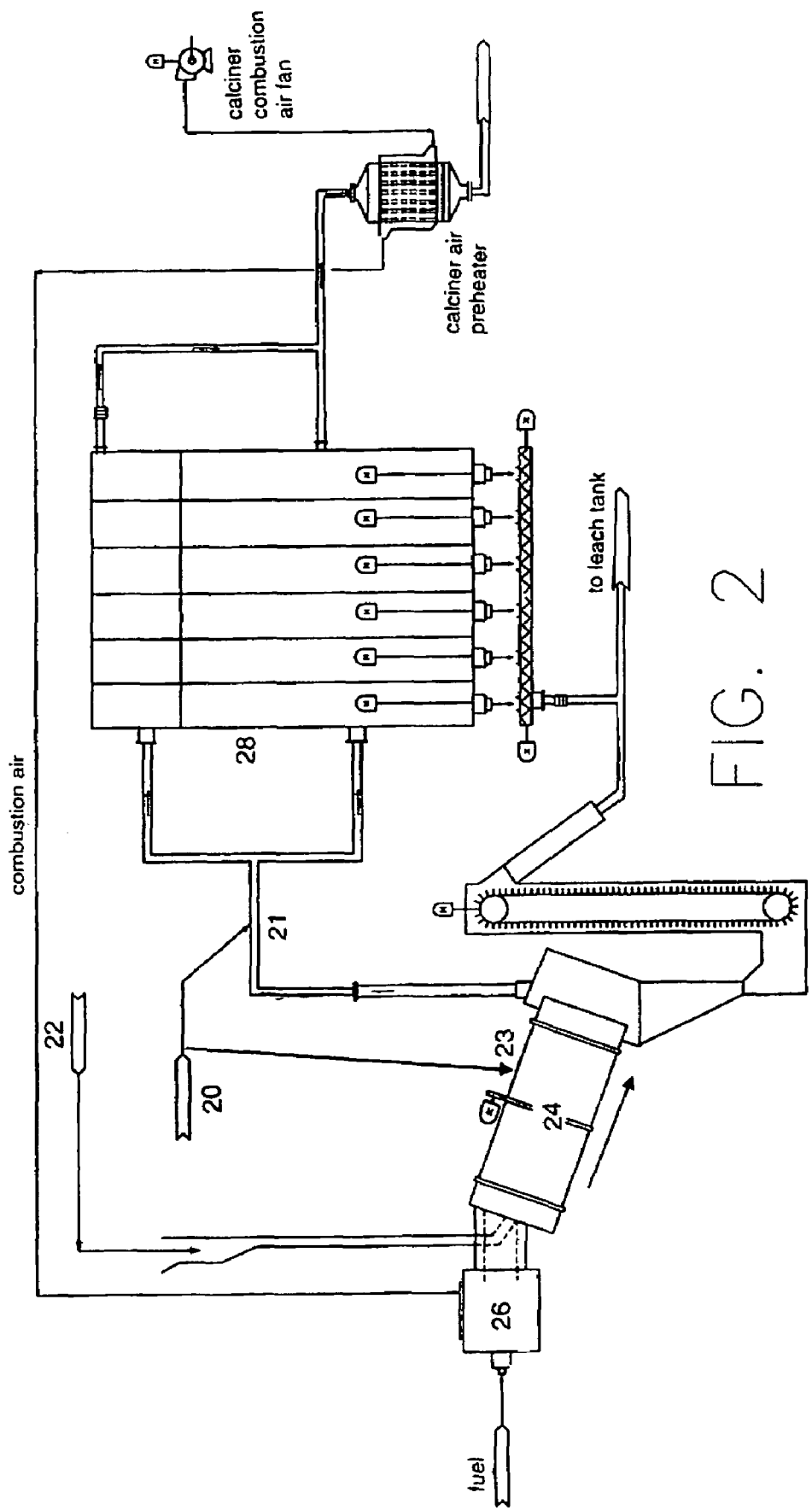
FIG. 2 is a schematic representation of one embodiment of a process for calcining dust material.

In one embodiment, FIG. 2 illustrates an improved process for handling and processing dust material. The dust material and trona ore granular material are introduced separately for calcination. The trona ore granular material 22 is fed to the calciner 24 at the hot end or flame end of the rotary calciner by suitable means such as a calciner feed belt. The dust material 20 is introduced at a separate and downstream location from that of the trona ore granular material. The dust material may be introduced into the exhaust gas stream of the calciner, prior to or at the plenum of the particulate capture device 28 such as at point 21

When the dust material is introduced into the exhaust gas stream, it may be preferable to introduce the dust material in such a manner as to avoid dust exiting through the calciner spill and disrupting the calciner spill temperature controls. In other words, it may be preferable to introduce the dust such that it is effectively carried to the particulate capture device.

The exhaust gas may be of any suitable composition and temperature. A suitable temperature is one which affects the desired change in the dust material, for example calcination or drying. For calcination, the exhaust gas temperature is at least about 300° F., preferably between about 300 and about 500° F., more preferably between about 300 and about 400° F., even more preferably between about 350° F. and 400° F. After injection of the dust material, the temperature of the exhaust gas may decrease less than about 100° F., preferably less than about 50° F., more preferably less than 20° F., alternatively between about 10 and about 50° F.

In other embodiments, the dust material may be introduced directly to the calciner, although at a location downstream of that where the granular material is introduced. For example, the granular material may be introduced at the front end or hot end of the calciner. The dust material may be introduced into the calciner downstream of the front end of the calciner, for example at point 23 in FIG. 2. In some embodiments, it may be preferable to introduce the dust material downstream of the flame of a calciner burner 26. In other embodiments it may be preferable to minimize contact of the dust material with a calciner burner flame.

Preferably the dust material is pneumatically transferred by suitable means including, for example, a dilute phase transporter or dense phase transporter. In one aspect, a blower, dust feeding pump and pipe are used to pneumatically transfer the dust material. Any suitable gas or combination of gases can be used to transfer the dust particles. Preferably air is used to pneumatically transfer the dust particles. The transfer gas may be of any suitable temperature such as ambient temperature. Preferably the gas has a suitable temperature to avoid condensation in the duct or piping. The gas temperature may be at least 100° F., preferably between about 100 and about 250° F., more preferably between about 150 and 200° F. The dust particles are pneumatically transferred with a suitable gas pressure. The gas pressure may be between about 5 and about 10 PSIG, preferably between about 6 and about 8 PSIG.

In one example, when calcining a granular trona feed of about 325 tph, the pneumatic transfer gas has a volumetric flow rate between about 1500 and about 3000 ACFM (Actual Cubic Feet per Minute) depending on the amount of trona dust being transferred, preferably between about 1650 and about 1800 ACFM for transfer of 15 tph trona dust and between 2500 and 3000 ACFM for transfer of 30 tph trona dust. The pneumatic transfer gas flow may transport dust particles at any suitable rate such that the particulate capture device is not overloaded and the dust material is calcined, heated or dried. For a calciner fed with about 200 tph coarse trona, the rate of dust transfer may be less than 30 tph, preferably between about 1 and about 20 tph, more preferably about 15 tph. The percentage of dust injection to granular feed is often less than 20 wt. %, frequently less than 15 wt. %, preferably less than 10 wt. %, depending on the operating conditions and waste heat available in the calciner exhaust gas. The percentage of dust injection may be more than 2 wt. %, or preferably more than 5 wt. % of the granular feed.

The process of the present invention is applicable to any of a variety of materials which are heated. Heating may alter a material in a variety of ways including drying or calcination. Suitable materials include, but are not limited to ores, minerals, lime, cement, gypsum, coal, trona ore, phosphate, aluminum oxide, manganese carbonate, petrol coke, and sea water magnesite.

Any suitable heater known to one skilled in the art may be used in the present invention. Examples of heaters include, but are not limited to calciners, kilns, ovens, dryers, tumble dryers, fluidized bed dryers. The heater may be of any suitable configuration including stationary, a rotary-type or vertical-type. The heater may be fueled by any of a variety of fuels, including, but not limited to natural gas, electricity, coal or fuel oil. Preferably, the combustion products are compatible with, do not excessively contaminate, or react with the heated dust product.

The process of the present invention affords several advantages. For example, the improved process represents a cost savings by utilizing waste energy in the exhaust gas. The energy savings realized by the invention may range between 0.3 and 1.3 MMBTU/t trona dust injected, but more typically is expected to be between 0.5 and 1.0 MMBTU/t dust. Additional cost saving is realized by more efficient heat transfer to the granular material at the fend end (flame end) of the calciner which may allow the calciner to operate at a lower discharge temperature. Further advantages include reduction in the formation of soluble silica and organics in the calcined trona dust since the dust is not exposed to the hot flame, and reduction in slagging and refractory brick damage since the trona dust is not introduced in the hot end of the calciner.

The dust material has a particle size less than about 100 U.S. mesh, preferably less than about 200 U.S. mesh, more preferably less than about 270 U.S. mesh.

The granular material has a particle size greater than about 200 U.S. mesh, preferably greater than about 100 U.S. mesh, more preferably greater than about 40 U.S. mesh.

In some embodiments, the process may further comprise crushing a solid material to form the dust material and granular material; and separating the dust material and granular material. The dust material may be collected in a particulate capture device such as a bag house. In some embodiments, the dust material may be pneumatically transferred from the particulate capture device used to collect the dust after crushing to the calcining or heating process equipment.

In some embodiments, the process may further comprise recovering the dust material from a particulate capture device. Particulate capture devices are known to one skilled in the art and include electrostatic precipitators, baghouses, air classifiers, and cyclonic separators. The material recovered from the particulate capture device and the processed granular material may be combined for further processing or processed separately. Further processing steps for the processed granular, processed dust material, or combination thereof may include: dissolving the material in a solvent, crystallizing the material from a solvent, separating the crystallized material from a filtrate, drying the crystallized material.

EXAMPLES

Provided below are non-limiting examples of the processes disclosed herein.

After crude trona ore is crushed, it is separated into granular and dust material. A typical particle size analysis of the dust and granular materials is shown in Tables 1 and 2 below, respectively.

TABLE 1

| Screened trona dust material characteristics | |
|---|---|
| U.S. Mesh Size | Wt. % |
| +100 | 2.6 |
| −100 + 140 | 2.3 |
| −140 + 200 | 5.0 |
| −200 + 270 | 12.3 |
| −270 + 325 | 6.4 |
| −325 + 400 | 6.8 |
| −400 + 450 | 7.4 |
| −450 + 500 | 10.8 |

TABLE 1-continued

Screened trona dust material characteristics

| U.S. Mesh Size | Wt. % |
| --- | --- |
| −500 + 635 | 9.5 |
| −635 | 36.9 |
| | 100.0 |

TABLE 2

Screened trona granular material characteristics

| U.S. Mesh Size | Wt. % |
| --- | --- |
| +5/16 | 0 |
| −5/16 + 1/4 | 30.7 |
| −1/4 + 4 | 12.2 |
| −4 + 8 | 17.7 |
| −8 + 40 | 20.2 |
| −40 + 100 | 9.5 |
| −100 + 200 | 4.2 |
| −200 | 5.5 |
| | 100.0 |

Example 1

A test run is conducted wherein trona dust from a crusher baghouse is pneumatically transferred to the exhaust gas of a gas-fired rotary calciner at a rate of about 30 tph using 2700 ACFM air at 110° F. The granular trona material is fed to the calciner at a rate of 325 tph. The exhaust gas flow rate is about 650,000 pph. The exhaust gas temperature is 378° F. at the exit of the calciner before trona injection and 293° F. after the trona injection point at the plenum of an electrostatic precipitator. Samples are collected from the calciner spill and electrostatic precipitators. A particle size analysis of the calciner spill shows that about 83-94 wt % of the material is +100 mesh (about 17-6 wt % is −100 mesh). About 97 wt. % of the recovered trona dust is −100 mesh. None of the samples contain detectable $NaHCO_3$. Energy efficiency is improved as compared to a run without trona dust.

The above examples are illustrative only, and should not be interpreted as limiting since further modifications of the disclosed embodiments will be apparent to those skilled in the art in view of this teaching. All such modifications are deemed to be within the scope of the invention described herein and defined by the following claims.

What is claimed is:

1. In a process for preparing soda ash from crude trona by calcining crude trona, the improvement comprising:
   injecting trona dust into an exhaust gas stream from an outlet of a calciner;
   calcining the trona dust in the exhaust gas stream to form calcined trona dust; and
   recovering the calcined trona dust.

2. The process of claim 1, wherein the injecting comprises pneumatically transferring the trona dust with a first gas.

3. The process of claim 1, wherein with the first gas has a pressure between about 5 PSIG and about 10 PSIG.

4. The process of claim 2, wherein the first gas has a first gas temperature of at least 100° F. prior to combining with the exhaust gas stream.

5. The process of claim 2, wherein the first gas has a pressure between 5 PSIG and about 10 PSIG and a first gas temperature of at least 100° F.; wherein the first gas is air.

6. The process of claim 2, wherein the exhaust gas stream from the outlet of the calciner has a temperature between about 350° F. and about 400° F.

7. The process of claim 2, wherein the exhaust gas stream has a stream temperature between about 300° F. and about 500° F.

8. The process of claim 7, wherein at least 90 wt. % of the trona dust has a particle size less than 100 mesh, and at least 90 wt. % of the crushed trona has a particle size greater than 100 mesh.

9. The process of claim 2, further comprising:
   injecting the trona dust prior to or at a first particulate capture device; and
   collecting the calcined trona dust captured in the first particulate capture device.

10. The process of claim 9, wherein the first particulate capture device is an electrostatic precipitator.

11. The process of claim 9, further comprising:
   crushing a trona ore to form trona dust and crushed trona;
   separating the trona dust from the crushed trona;
   injecting the crushed trona into the calciner;
   calcining the crushed trona to form calcined crushed trona; and combining the calcined crushed trona and the calcined trona dust to form combined calcined trona.

12. The process of claim 11, wherein the injecting of the trona dust comprises between about 1 to about 15 parts by weight per hour of trona dust and the calcining the crushed trona comprises about 100 parts by weight per hour of crushed trona.

13. The process of claim 9, wherein the calciner is fueled by natural gas, electricity, coal or fuel oil.

14. The process of claim 13, wherein the improvement comprises an energy savings of between about 1 to about 5% MMBTU/ton trona ore as compared to the process run without the trona dust.

15. The process of claim 1, further comprising crushing the crude trona in a crusher device to form the trona dust;
   collecting the trona dust in a second particulate capture device; and
   pneumatically transferring the trona dust from the second particulate capture device to the exhaust gas stream.

16. The process of claim 15, wherein the second particulate capture device is a baghouse.

17. The process of claim 15, wherein the trona dust is pneumatically transferred with a first gas having a first gas temperature of at least 100° F. prior to combining with the exhaust gas stream.

18. The process of claim 17, wherein with the first gas has a pressure between about 5 PSIG and about 10 PSIG.

19. The process of claim 18, wherein the exhaust gas stream has a stream temperature between about 300° F. and about 500° F.

20. The process of claim 19, wherein the injecting comprises between about 1 to about 15 parts by weight per hour of trona dust and the calcining the crushed trona comprises about 100 parts by weight per hour of crushed trona.

21. The process of claim 15, further comprising:
   injecting the trona dust prior to or at a first particulate capture device; and
   collecting the calcined trona dust captured in the first particulate capture device.

22. The process of claim 21, wherein the first particulate capture device is an electrostatic precipitator.

23. The process of claim 21, further comprising:
crushing a trona ore to form trona dust and crushed trona;
separating the trona dust from the crushed trona;
injecting the crushed trona into the calciner;
calcining the crushed trona to form calcined crushed trona; and combining the calcined crushed trona and the calcined trona dust to form combined calcined trona.

24. The process of claim 23, wherein the trona dust is pneumatically transferred with a first gas having a first gas temperature of at least 100° F. prior to combining with the exhaust gas stream.

25. The process of claim 23, wherein the injecting comprises between about 1 to about 15 parts by weight per hour of trona dust and the calcining the crushed trona comprises about 100 parts by weight per hour of crushed trona.

26. The process of claim 25, wherein the trona dust is pneumatically transferred with a first gas having a first gas temperature of at least 100° F. prior to combining with the exhaust gas stream; where the first gas has a pressure between about 5 PSIG and about 10 PSIG; and wherein the exhaust gas stream has a stream temperature between about 300° F. and about 500° F.

27. A process for preparing soda ash from crude trona by calcining crude trona comprising:
a. removing a trona dust from a crushed crude trona feed being fed to a calciner;
b. injecting the removed trona dust into an exhaust gas stream from the calciner to form calcined trona dust; and
c. recovering the calcined trona dust.

28. The process of claim 27, wherein the calciner is a rotary kiln-type calciner.

29. The process of claim 27, further comprising:
capturing the trona dust from the crushed crude trona feed in a particulate capture device; and
pneumatically transferring the trona dust from the particulate capture device to the exhaust gas stream.

30. The process of claim 27, further comprising:
d. dissolving the recovered calcined trona dust in a solvent to form a sodium carbonate liquor; and
e. crystallizing sodium carbonate from the liquor.

31. The process of claim 30, further comprising:
f. separating the crystallized sodium carbonate from the liquor; and
g. drying the crystallized sodium carbonate.

32. In a process for preparing soda ash from crude trona by calcining crude trona, the improvement comprising:
separating the crude trona into a fine particle size part and a coarse particle size part;
injecting the coarse particle size part at a first location of the calciner, wherein the first location is at the hot end of the calciner;
injecting the fine particle size part at a second location of the calciner, wherein the second location is an exhaust duct exiting the calciner and wherein the second location is downstream of the first location; and
recovering calcined trona.

33. The process of claim 32, wherein at least 90 wt. % of the fine particle size part has a particle size less than 100 mesh, and at least 90 wt. % of the coarse particle size part has a particle size greater than 100 mesh.

34. The process of claim 32, further comprising introducing a flame at the first location of the calciner, and wherein the second location is downstream of the flame.

35. The process of claim 34, wherein the calciner is a rotary kiln-type calciner.

36. A process for preparing soda ash from crude trona by calcining crude trona comprising:
a. removing trona dust from trona ore comprising crushed trona and trona dust, said trona dust having a particle size smaller than a particle size of the crushed trona;
b. introducing crushed trona into a calciner;
c. heating the crushed trona in the calciner;
d. injecting the trona dust into an exhaust gas stream from the calciner; and
e. recovering an injected trona dust.

37. The process of claim 36, further comprising:
capturing the trona dust from the trona ore in a particulate capture device; and
pneumatically transferring the trona dust from the particulate capture device to the exhaust gas stream.

38. The process of claim 37, further comprising introducing the trona dust into the exhaust gas stream in a plenum of the particulate capture device.

* * * * *

UNITED STATES PATENT AND TRADEMARK OFFICE
CERTIFICATE OF CORRECTION

| | | |
|---|---|---|
| PATENT NO. | : 7,771,690 B2 | Page 1 of 1 |
| APPLICATION NO. | : 11/591162 | |
| DATED | : August 10, 2010 | |
| INVENTOR(S) | : Alain Vandendoren et al. | |

It is certified that error appears in the above-identified patent and that said Letters Patent is hereby corrected as shown below:

<u>In the Claims</u>

In column 7, claim 3, line 63, after "claim 1, wherein" delete "with".

Signed and Sealed this
Twenty-eighth Day of December, 2010

David J. Kappos
*Director of the United States Patent and Trademark Office*